(12) United States Patent
Doehla et al.

(10) Patent No.: US 7,172,171 B2
(45) Date of Patent: Feb. 6, 2007

(54) CONTROLLABLE SOLENOID VALVE

(75) Inventors: Werner Doehla, Gefrees (DE); Michael Rauch, Markleuthen (DE)

(73) Assignee: Rausch & Pausch GmbH, Selb (DE)

( * ) Notice: Subject to any disclaimer, the term of this patent is extended or adjusted under 35 U.S.C. 154(b) by 63 days.

(21) Appl. No.: 10/531,403

(22) PCT Filed: Oct. 15, 2003

(86) PCT No.: PCT/DE03/03449

§ 371 (c)(1),
(2), (4) Date: Apr. 14, 2005

(87) PCT Pub. No.: WO2004/036057

PCT Pub. Date: Apr. 29, 2004

(65) Prior Publication Data

US 2006/0048824 A1    Mar. 9, 2006

(30) Foreign Application Priority Data

Oct. 15, 2002    (DE)    ................... 102 48 501

(51) Int. Cl.
*F15B 13/044*    (2006.01)
(52) U.S. Cl. ................. 251/129.15
(58) Field of Classification Search ............ 251/129.15
See application file for complete search history.

(56) References Cited

U.S. PATENT DOCUMENTS 2,910,089 A * 10/1959 Yarber .................. 137/625.65

6,412,884 B1    7/2002 Takayama et al.
2003/0038260 A1* 2/2003 Matsusaka et al. ..... 251/129.15

FOREIGN PATENT DOCUMENTS

DE    37 22 344    1/1989
EP    0 565 190    10/1993

* cited by examiner

*Primary Examiner*—J. Casimer Jacyna
(74) *Attorney, Agent, or Firm*—Jordan and Hamburg LLP

(57) ABSTRACT

Controllable solenoid valve in which, due to the interaction between a magnetic force caused by an electrical flow and a spring force acting against the magnetic force, at least one first sealing body in the interior of a valve housing is displaced in axial direction between two final positions whereby moving relative to its first sealing seat. The interior extends from one electromagnet to a connection. To enable, in a simple manner, a specific reproducible influencing of the sequence speed of cylinder controls in hydraulic drives and to prevent uncontrolled movements by these drives, the first sealing seat up to the first sealing body is provided with an axially extending cylindrical housing inside of which a slide is axially displaced according to the electrical flow. The cylindrical housing comprises radially oriented passages, whereby these passages are closed if the first sealing body is located in a final position in its first sealing seat or in the immediate vicinity of the first sealing seat, and the passages are opened if the first sealing body is located in the opposite final position.

6 Claims, 9 Drawing Sheets

CONTROLLABLE SOLENOID VALVE

BACKGROUND OF THE INVENTION

The invention relates to a controllable solenoid valve according to the species of the patent claims. These kinds of valves are used in such applications that intend to influence the sequence speed of cylinder controls in hydraulic drives, in particular in automatic convertible tops.

For the control of convertible top sequences, 3/2 solenoid valves are used in poppet design which are for example described in DE 3722344 A1. To prevent refluxes, an additional check valve can be installed at the pump connection or partly integrated into the solenoid seat valve, see EP 0 565 190 A1. In practical applications, weights and cinematic forces determine the movement sequences. In certain positions the own weight of the top already causes a movement. Said forces lead to unwanted high movement speeds and cause the top to slide into the end stops without being slowed-down, thus causing disturbing noise and rebounds.

In vehicles, spring or buffer elements reduce this rebound noise only in an imperfect manner. Throttles fixed in the tank adapter of the individual cylinder are known as hydraulic absorbing means. But the hydraulic throttling has several disadvantages. As the throttle effect does not change in the whole movement range, it represents a compromise; the two options are a complete rapid motion sequence and a relatively unbraked run into the end position or a completely slow motion sequence and a relatively soft rebound. Moreover, the adjustment of the hydraulic throttles is a time-consuming and labor-intensive process, because the components produced cannot be modified later. Mostly, different throttle cross sections are required within the valve connection system to get an optimum sequence. This development leads to the most expensive variant and involves the risk of mix-ups in the production process; thus, it will require more efforts. Moreover, the rigid adjustment is principally suited for one specific kind of application only; each new application requires new components.

A controllable pressure-limiting valve inserted into the tank connection of a cylinder can be used as another hydraulic solution. Thus, a counterpressure is built up which also slows down the displacement of oil out of the cylinder chamber. But in this way an additional solenoid valve is to be used which requires a corresponding space, electrical energy and trigger electronic units.

SUMMARY OF THE INVENTION

The aim of the present invention is to correct said faults and to enable, in a simple manner, a specific reproducible influence on the sequence speed of cylinder controls in hydraulic drives and to prevent uncontrolled movements caused by these drives.

According to the invention, this task is tackled by the elements of the first patent claim. The elements of the subclaims support the further advantageous development and specification of the invention. Thanks to the possibility to select and adjust the electric triggering system and to modify a solenoid valve seat, a cylinder control for hydraulic drives can be designed in a considerably simplified and reliably functioning manner. In addition to this, it allows the demonstration of the proportional action of the throttling of a liquid flow.

In the throttling range, the magnet of the solenoid valve is acting against a relatively stiff spring (ca. 5 to 20 N/mm). The value of electric current supplied to the solenoid valve determines the position of the valve locking body or sealing body. Basically, the components can be arranged in such a way that in the non-energized state of the electromagnet the connection between two connection openings of the solenoid valve is either opened or closed. If for a corresponding valve the connection of the two connection openings is opened in the non-energized state of the electromagnet and the pressure spring has its maximum possible extension, the slide or piston connected to the solenoid armature closes radial-oriented passages (boreholes, long holes, etc.) with the current increasing. Thus, the flow cross section between the connection openings is reduced. The throttle effect increases and the cylinder movement is specifically influenced. At the end of the control range, only gap leakages between the two connection openings are possible. This invention also includes the options to close only one passage or different passages in a cylindrical housing by means of the slide.

For the process just described, the slide moves within the cylindrical interior of a housing of a solenoid valve, which can preferably be a 3/2 or 2/2 solenoid valve. At one end of this valve, the electromagnet is positioned and at its other end a pump connection is installed prolonging the cylindrical interior. For a fixed, maximum switching current, the solenoid drive of the slide overcomes the pressure forces at the pump connection and thus it connects the pump connection and the radial connection opening in the housing located most closely to it. At the same time, the communication between the two radial connection openings is interrupted by another sealing element in such a way that even leakages are avoided. Then, a triggered cylinder can be moved towards the opposite direction.

According to the invention, the control function is achieved without needing additional solenoid valves and with the minimum possible space requirements. It ensures a high grade of reproducibility for the manufacturing process and a simple replacement for retrofitting purposes. Even for devices that have already been installed, modifications or optimizations of the movement sequences only require the adjustment of the electric or electronic trigger action. Adjustments and fine adjustments can be made during the manufacturing process by means of an adjuster provided at the slide. The electrically adjustable throttling allows various applications of the invention for control tasks waiting to be solved as a far as a solenoid valve is used.

BRIEF DESCRIPTION OF THE DRAWINGS

In the following, three design examples explain the invention and its application in detail in a schematic drawing. They show.

DETAILED DESCRIPTION

Figure 1:
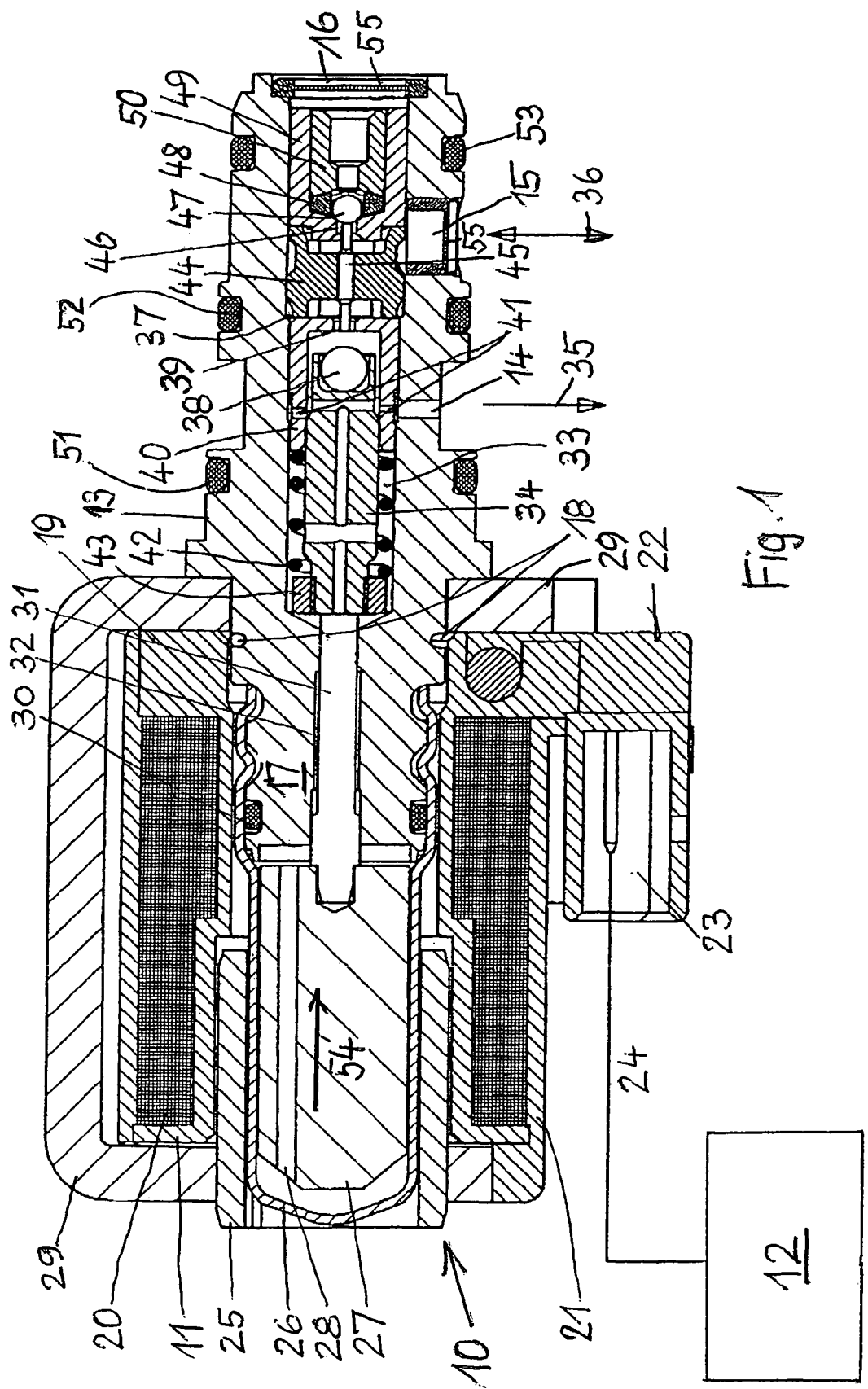
FIG. 1 an inventive solenoid valve in an axial section and in a non-energized state, FIG. 2 an inventive solenoid valve according to FIG. 1 supplied with a low current, FIG. 3 an inventive solenoid valve according to FIG. 1 supplied with a medium current, FIG. 4 an inventive solenoid valve according to FIG. 1 supplied with a high current, FIG. 5 an inventive solenoid valve according to FIG. 1 supplied with a maximum current, FIG. 6 a diagram demonstrating the dependence of the flow on the value of the coil current, FIG. 7 a diagram demonstrating the dependence of the slide position on the value of the coil current, FIG. 8 a first example for the application of the inventive solenoid valve, and FIG. 9 a second example for the application of the inventive solenoid valve.

FIG. 1 shows a solenoid valve 10 which principally consists of an electromagnet 11 with an electric control unit 12 and a housing 13 provided with connection openings 14, 15 as well as a connection 16. One end 17 of the housing 13 located opposite to the connection 16 projects into the electromagnet 11 and is fixed to it by pins 18 or screws. The two components 11 and 13 could also be connected with each other by a screwed joint.

The electromagnet 11 is a wire-wound coil 20 the wire of which is wound around a hollow winding body 19 made of insulation material. If an electric current flows through the coil 20, the coil generates a magnetic field that depends on the value of this current flow. Along its circumference, the coil 20 is provided with an electrically insulating and heat-dissipating extrusion coating 21. At one terminal 22 of the winding body 19, a plug-type connector 23 is provided for a line 24 leading to the electric control unit 12 that supplies a current of changing values to the coil 20.

In a bush 25 fitted into the winding body 19 a guiding pipe 26 for an armature 27 of the electromagnet 11 is located and is fixed to the end 17 of the housing 13 at one end and is closed at its other end. A sealing ring 30 seals the fixed connection between the housing 13 and the guiding pipe 26. The armature 27 is provided with a longitudinal borehole 28 for compensating the pressure between the spaces before and behind the armature. A bow 29 contacts the end of the bush 25 projecting out of the electromagnet 11 and surrounds the insulated wire coil 20 at least partly so as to contact the valve housing 13, too. The bush 25 transmits the magnetic flux from the bow 29 to the armature 27. The bow 29 passes the magnetic force further to the housing 13 and ensures the magnetic reflux. The front side of the housing 13 facing the armature 27 is perfectly designed to have an optimum influence on the magnetic forces. The components 25, 29, 13, 27 form a magnetic circuit.

A pin 31 is fixed to the armature 27, for example by a screw joint, and projects through an axial borehole 32 in the housing 13 into an also axially oriented interior 33 and actuates a slide 34 there. The interior 33, into which the connection openings 14, 15 to the tank reflux 35 or to the cylinder (consumer) 36 lead, is provided with a ring-shaped shoulder 37 between the connection openings. This shoulder is formed by an extension of the interior 33 towards the connection 16 of the pump. The connection opening 15 and the connection 16 are provided with filters 55 that prevent contaminating substances possibly contained in the liquid from getting into the valve 10.

At its end opposite to the pin 31 the slide 34 has a sealing ball (sealing element) 38 to which a (second) sealing seat 39 belongs that is attached as a front piece to a cylinder 40 which has been installed in axial position and is opened at its side towards the electromagnet 11. Into the open cylinder 40, which is fixed in the interior 33 and is provided with radial boreholes 41 (holes, longitudinal holes, passages or similar holes) that can have different diameters for current-flow reasons, the slide 34 partly projects to be guided so that it releases the radial boreholes 41 in a non-energized state of the electromagnet 11 and closes them if the electromagnet 11 is highly energized. The slide 34 is surrounded by a helical spring 42 supported at one side by the cylinder 40 and at its other side by an adjusting element 43 which is screwed onto the pin end of the slide. The adjusting element 43 can also be fixed to the slide 34 in another way. Neither must the spring 42 principally be formed like a helical spring nor be arranged around the slide 24. For example, it is also possible that it surrounds the armature of the electromagnet.

A guiding body 44 for an axially arranged and moveable tappet 45 is provided with liquid channels and pressed against the shoulder 37. This tappet 45 terminates in the sealing seat 39 at one end and at its other end it terminates in a (second) sealing seat 46 for another sealing ball (sealing element) 47 and acts upon the sealing ball 47, if required. Said ball is supported by a telescopic ball bearing traveler 48 located within a cylinder 49 which is fixed at the sealing seat 46 and is open towards the pump connection 16. Said cylinder is fitted into the extended interior 33 and contains a sealing seat 50 itself for the sealing ball 47, which is lifted from the sealing seat 50 due to the pump pressure. Moreover, sealing rings 51, 52, 53 are provided at the housing 13 for fitting the solenoid valve 10 into a device (not shown). For this purpose, the sealing ring 51 is used as a sealing element to the outside, the sealing ring 52 seals the space between the two connection openings 14 and 15 and the sealing ring 53 seals the space between the connection opening 15 and the connection 16.

The armature 27, the pin 31 and the slide 24 are mainly arranged in coaxial position to a common geometric axis, whereby the pin 31 projects into a recess at the armature 27 and the spring 42 ensures its permanent connection to the armature 27. Connections between the individual components differing from the ones shown are possible.

Figure 2:
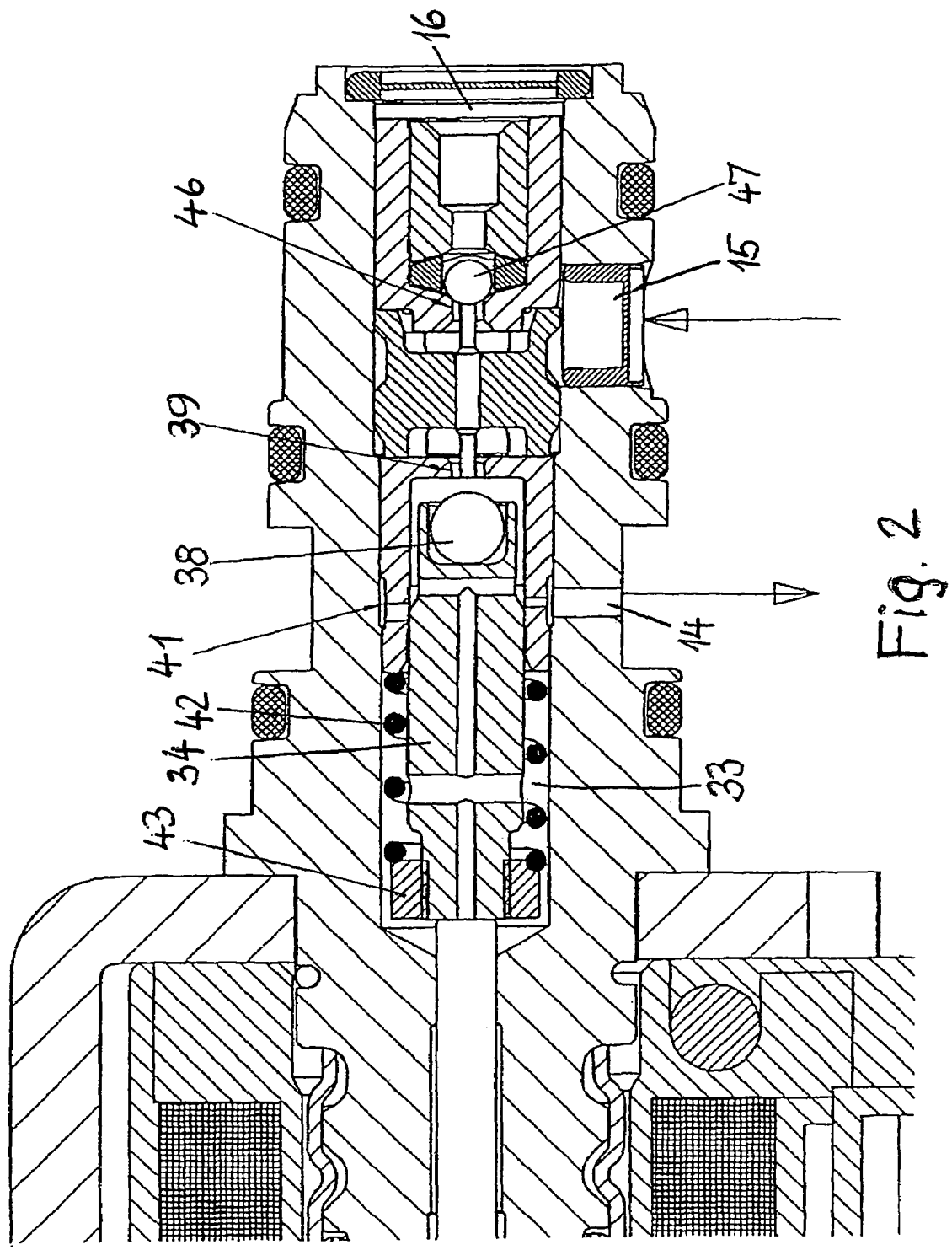
Figure 6:
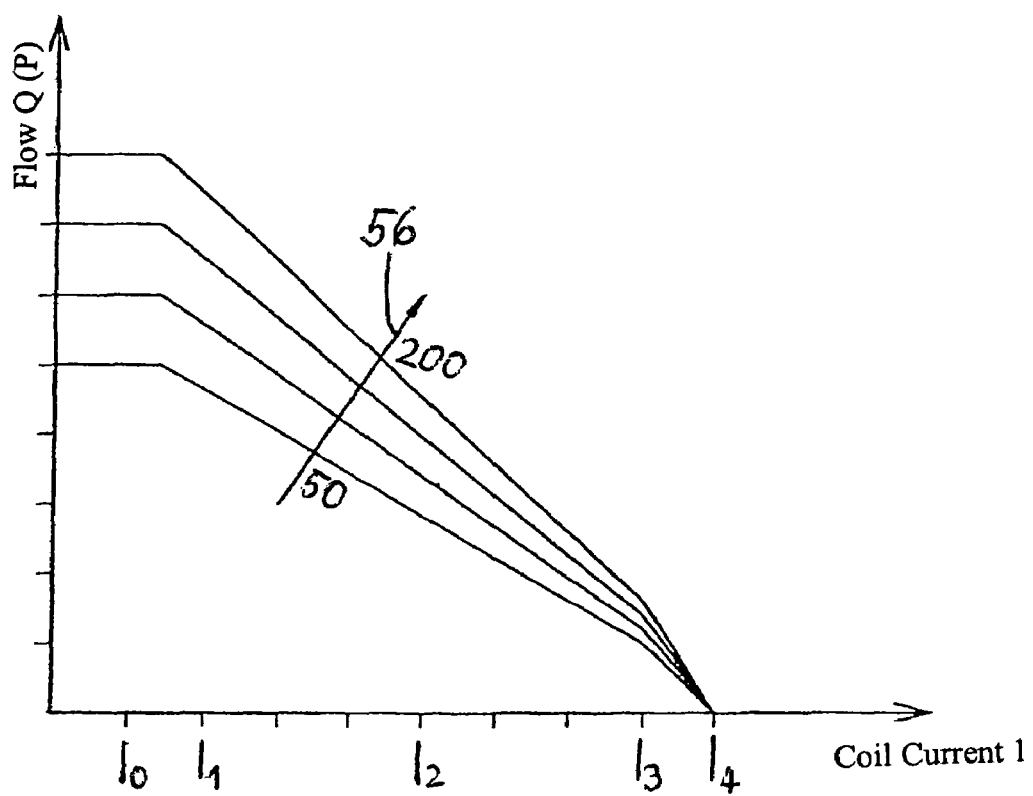

In the representation given in FIG. 1, the solenoid valve 10 is not energized ($I_0$ in FIG. 6). The electromagnet 11 is not switched on, the armature 27 is in the position shown, the adjusting element 43 contacts the appropriate front face of the cylindrical interior 33, the radial boreholes 41 are completely open, a medium can freely flow from the connection opening 15 through the sealing seat 39 to the connection opening 14. If a current I is switched on by the control unit 12, the armature 27 moves towards the direction indicated by an arrow 54. If first a current $I_1$ (FIG. 6) which is considered to be low for the valve 10 is supplied, i.e. the solenoid valve 10 is in a low-energized state, the armature 27 will move by also a short distance only towards the direction indicated by the arrow 54 till the magnetic force and the force of the spring 42 are balanced. This condition is shown in FIG. 2 in which the adjusting element 43 is lifted from the appropriate front face of the interior 33, the larger one of the radial boreholes 41 is partly closed by the displacement of the slide 34, the flow of the liquid from the connection opening 15 to the connection opening 14 is slightly throttled by the valve 10. The sealing ball 38 is still far away from the sealing seat 39 belonging to it, whereas the sealing ball 47 is located in the sealing seat 46 and prevents the flow from the connection opening 15 to the connection 16.

Figure 3:
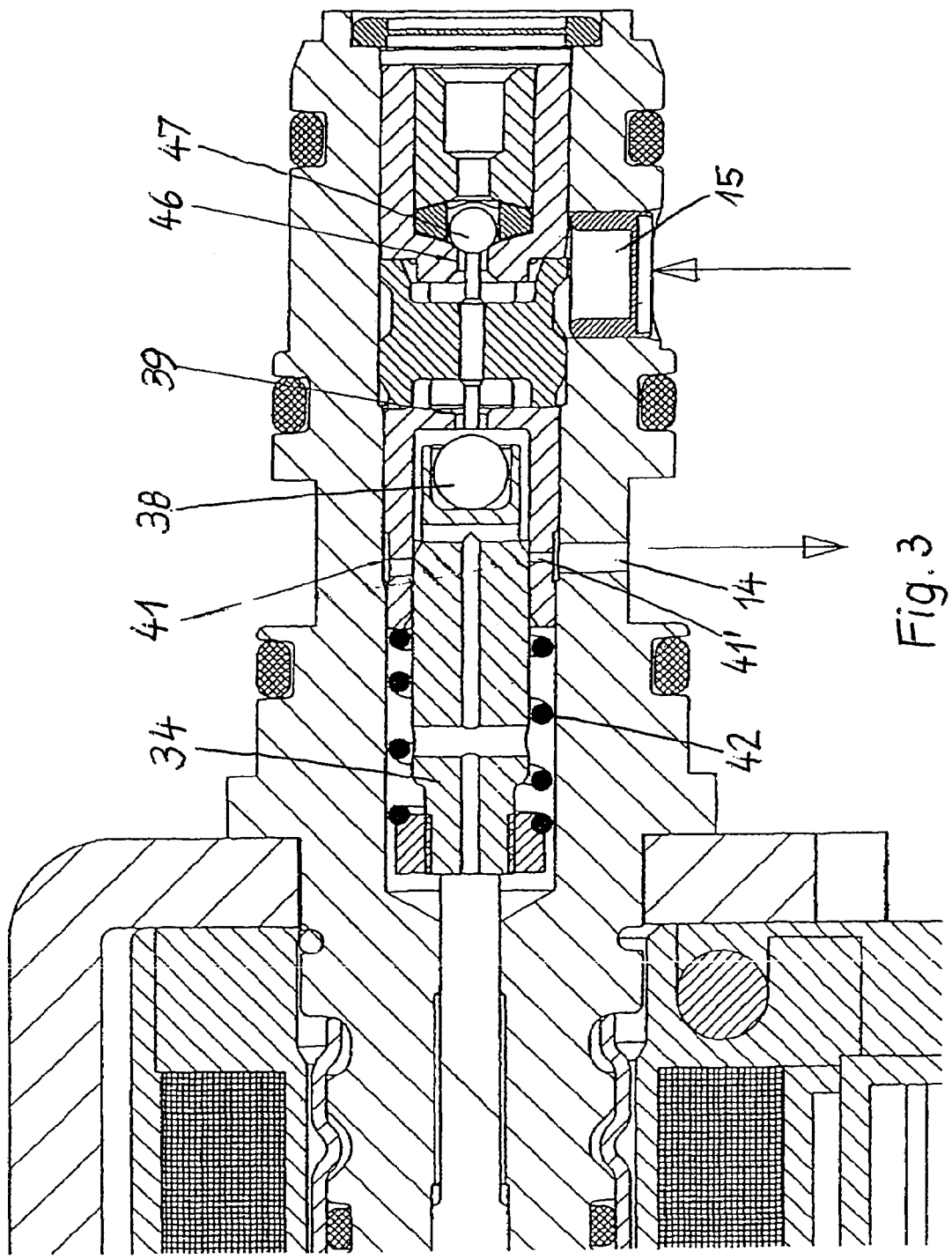

If a current $I_2$ that is considered medium-high for the valve 10 is supplied by means of the control unit 12, the solenoid valve 10 is carrying a medium-high current according to the representation in FIG. 3. The armature 27 and with it the slide 34 move into a balanced position due to the now effective magnetic force and the counterforce of the spring 42. In this position, the slide 34 closes the larger radial borehole 41 completely and the smaller radial borehole (41' in FIG. 3) partly. Thus, the flow from the connection opening 15 to the connection opening 14 is stronger throttled (medium throttling) than in FIG. 2. The sealing ball 38 is not yet located in the appropriate sealing seat 39 and the sealing ball 47 is still closing the sealing seat 46.

Figure 4:
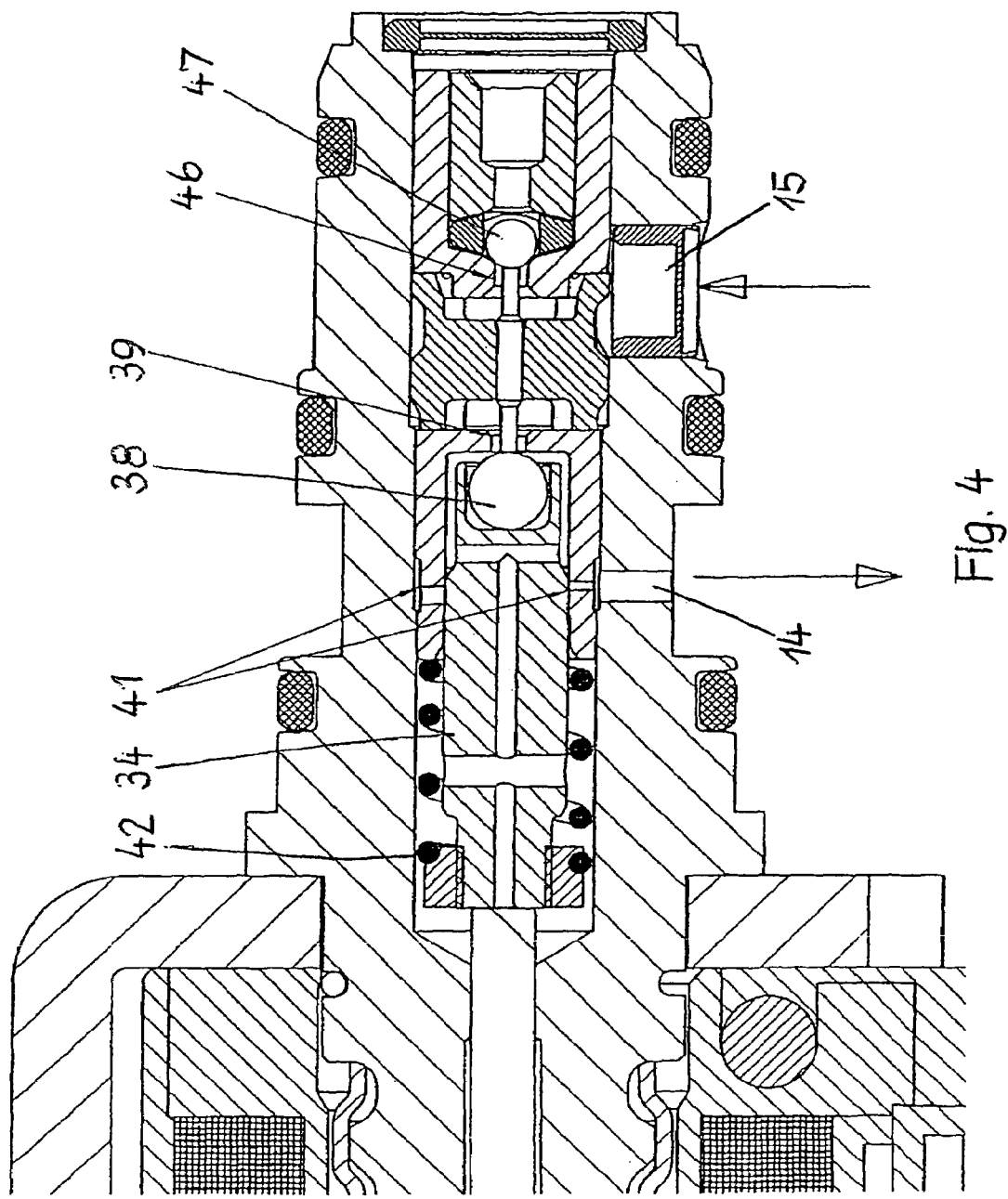

If a current $I_3$ that is considered high for the solenoid valve 10 is supplied, a balanced condition between the magnetic force and the spring force will only be reached, if the slide 34 completely closes the two radial boreholes 41. The sealing ball 38 has not yet closed the sealing seat 39 and the sealing ball 47 is still in the sealing seat 46. In this highly energized state of the solenoid valve 10, the flow from the connection opening 15 to the connection opening 14 is throttled in such a manner that only a leaking liquid is flowing (see FIG. 4).

Figure 5:
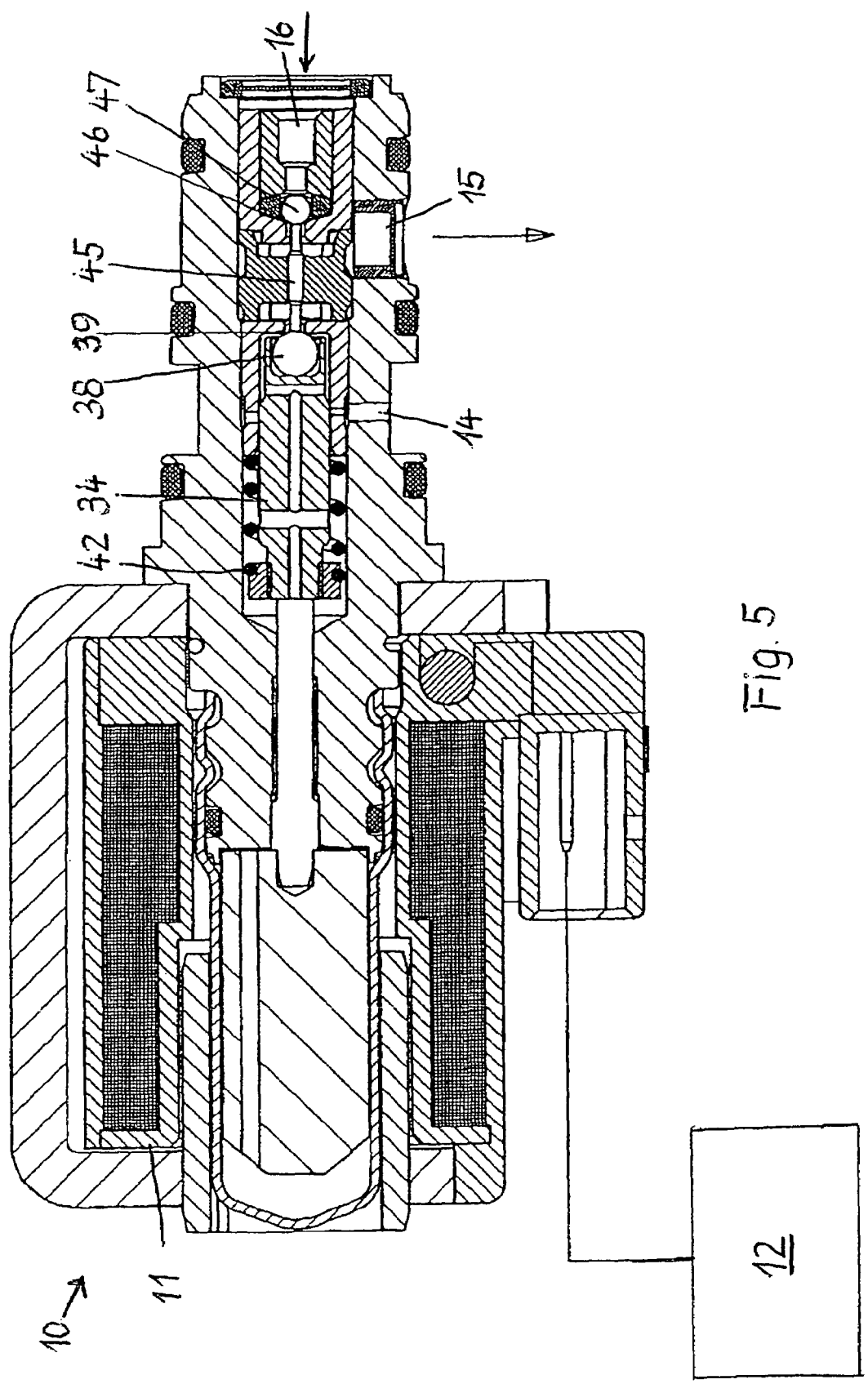

If the solenoid valve 10 is supplied with a maximum current $I_4$ by the control unit 12, the force of the electromagnet 11 is absolutely stronger than the force of the helical spring 42 and presses the sealing ball 38 against the sealing seat 39 via the slide 34 (see FIG. 5). At the same time, the ball 36 presses the ball 47 out of its sealing seat 46 by means of the bolt 45 so that the flow from the connection opening 15 to the connection opening 14 is completely interrupted and the flow from the connection 16 to the connection opening 15 is opened. In this case, a triggered cylinder could be actuated into the opposite direction.

It goes without saying that the states demonstrated in the FIGS. 2 through 5 are only given as examples, that the grading can vary according to the individual application and demand, it can be considerably finer or even rougher or also random. The control and thus the adjustment of the armature 27 or the slide 34 can also be performed in a continuous or discontinuous mode.

With the help of a diagram, FIG. 6 demonstrates the flow Q (P) between the connection openings 15 and 14 as a function of the relevant coil current. The diagram makes clear that—depending on the flow rate—an increasing pressure difference is built up towards an arrow 56 between the connection openings 15 and 14. For this solenoid valve 10, the pressure can increase from 50 bar for the smallest flow volume to 200 bar for the largest flow volume.

Figure 7:
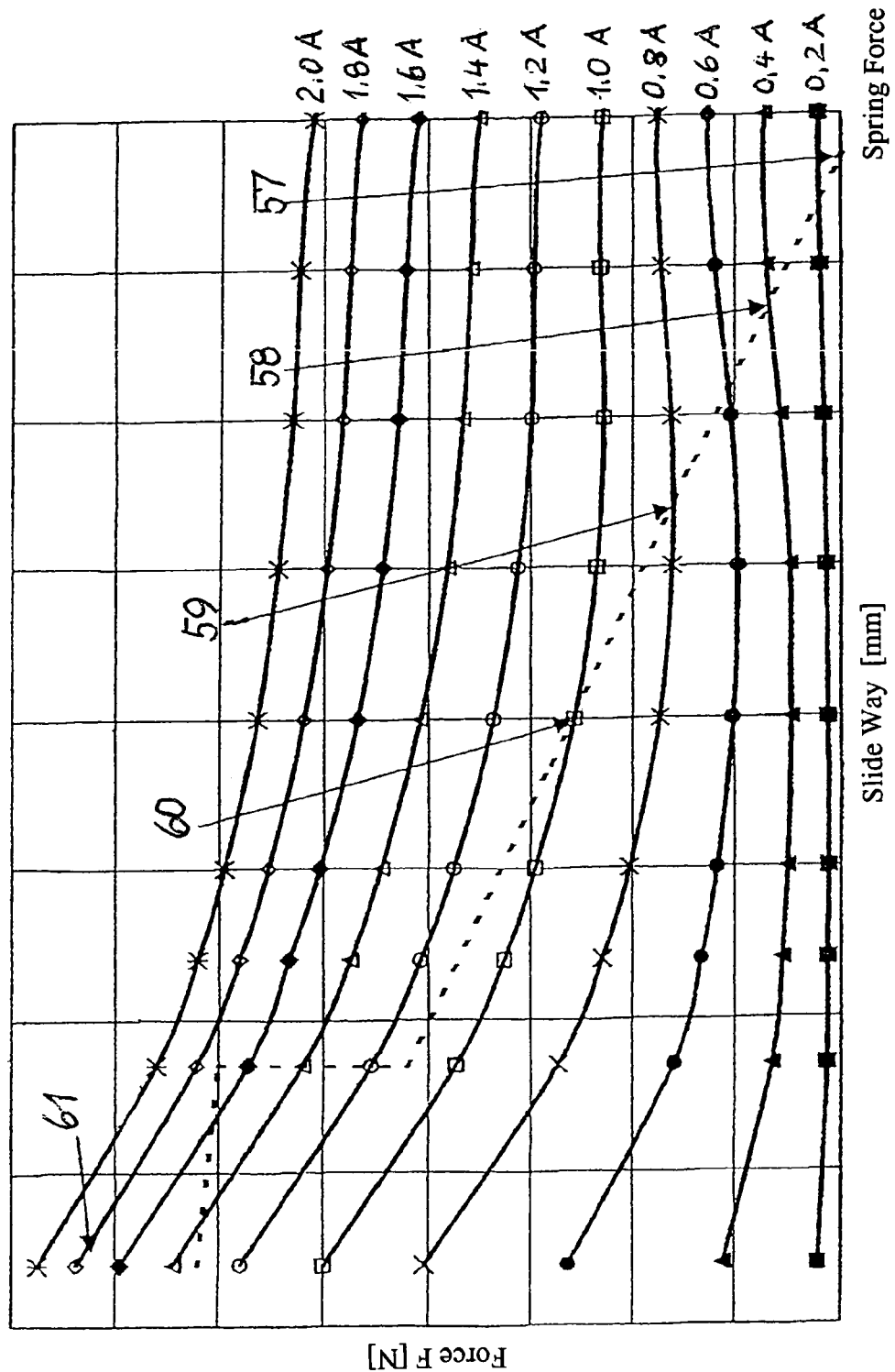

The diagram presented in FIG. 7, in which the electric current is increased from 0.2 A to 2 A in 0.2 ampere steps, clearly demonstrates the positions 57–60 of the slide 34 in which the magnetic force and the helical spring force are in a balanced condition and which correspond to the FIGS. 1 through 4. Thus, the solenoid valve 10 is in a non-energized state in position 57 in which the flow from the connection opening 15 to the connection opening 14 is not throttled and the flow from the connection 16 to the connection opening 15 is blocked. Whereas the flow in the other positions 58, 59, 60 is more and more throttled due to the low, medium and high currents $I_1$, $I_2$, $I_3$ connected to the wire-wound coil 20, the flow connection between the connection 16 and the connection opening 15 is kept blocked. Only in the position 61, in which the balanced condition of the forces of the electromagnet 11 and the helical spring 42 is not important any longer, the flow connection between the connection openings 15 and 14 is definitely blocked and the flow connection between the connection 16 and the connection opening 15 is opened due to the predominating magnetic force. If for example, the total way of the slide 34 from position 57 to position 61 is about 1 mm and the partial way from position 60 to position 61 is about 0.3 mm, the shorter slide way makes possible lower baffle effects and a smoother running of the slide 34 into the position 61 in relation to the state of the art.

Figure 8:
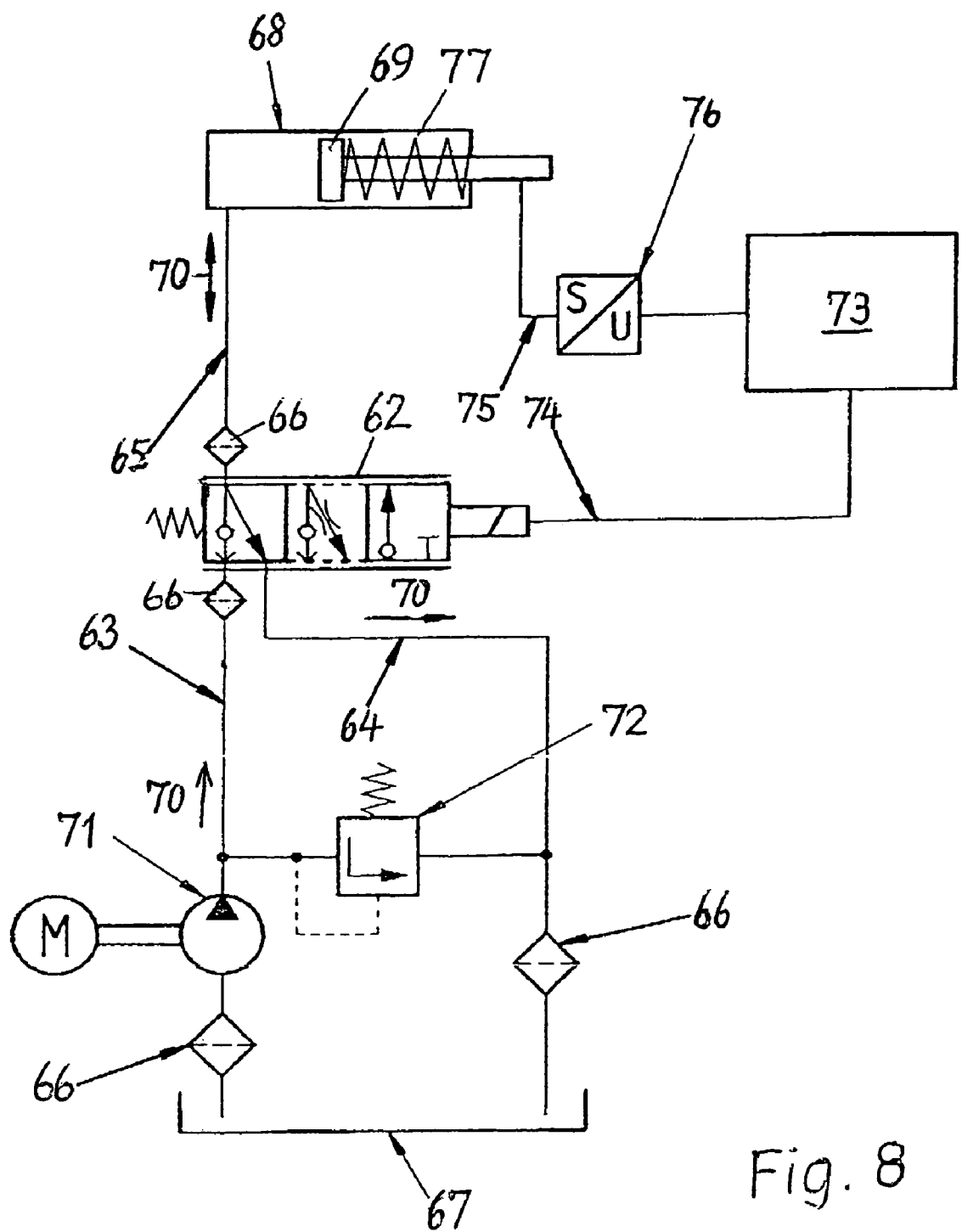
Figure 9:
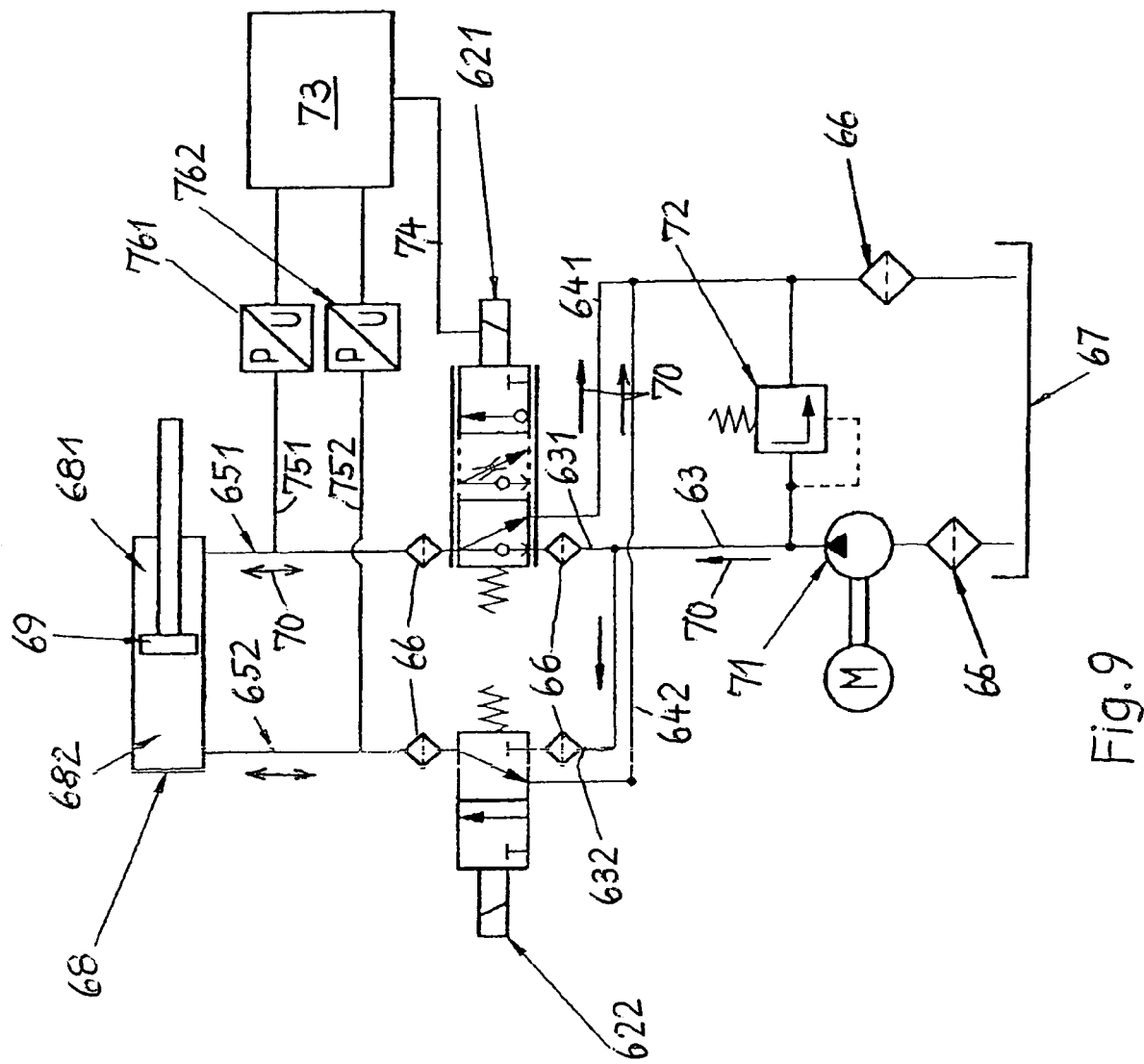

The FIGS. 8 and 9 show two examples for the application of the inventive valve arrangement for the speed- or pressure-dependent control of the relative movement of a piston within a cylinder. In FIG. 8, a solenoid valve 62 is designed as a 3/2 valve and is connected to a liquid tank 67 and a cylinder 68 via hydraulic lines 63, 64, 65 which are provided with filters for removing possible dirt out of the flowing medium. A piston 69 one side of which is under the pressure of a spring 77 slides in the cylinder 68. The flow directions of the medium through the lines 63, 64, 65 are indicated by the arrows 70 beside them. In the supply line 63 a pump 71 driven by the motor M is installed and, subsequent to it in flow direction, a connection for a pressure control valve 72 is arranged to avoid overpressures in the downstream system between the supply line 63 and the discharge line 64. An electrical control unit 73 is connected to the solenoid valve 62 and the piston 69 via electrical lines 74, 75 with a transducer 76 being installed in the line 75.

The pump 71 generates for example a pressure of 200 bar and a possible volume flow of 1 liter/min within the system. If the maximum permissible system pressure is exceeded, the pressure control valve 72 will open and will allow the medium to escape into the tank 67 until the permissible system pressure will be reached again. If the 3/2 valve 62 is in the maximally energized state (switched), the medium (hydraulic oil) will flow from the pump 71 via the valve 62 into the cylinder 68, and the piston 69 will be pressed out of the cylinder. During this process, the connection from the valve 62 to the tank 67 is closed as described above. If the solenoid valve 62 is in a non-energized state (rest position), the medium will flow without being throttled from the cylinder 68 via the valve 62 into the tank 67, and the piston 69 will move into the cylinder. The connection between the pump 71 and the valve 62 is closed during this process.

If the solenoid valve 62 is supplied with a current in the range $I_0 < I < I_4$ (FIGS. 2–5), that means that the slide 34 is within the control range, the medium will flow from the cylinder 68 via the valve 62 into the tank 67. Thus, the piston 69 is caused to move into the cylinder 68. The movement of the piston 69 is for example effected by the weight of a convertible top (not shown). Due to the position of the slide 34 (in the FIGS. 2–5) within the solenoid valve (10) 62 and the throttling combined with it, a certain volume flow is reached from the cylinder 68 into the liquid tank 67. This volume flow is directly proportional to the speed of the piston. The control unit 73 compares the speed measured at the piston 69 with a default value given by the specific application. If the two values are different, the control unit 73 calculates a new value for the volume flow through the valve 62 with the help of existing data (such as speed, cylinder dimensions, present valve current, valve characteristic curve, etc.). This value will be transferred to the valve. If the speed measured is too low, the valve current will be decreased. Consequently, the magnetic force will decrease, the spring 42 will press back the slide 34 (FIGS. 2–5), and the throttling will be reduced. The volume flow and thus the piston speed will be increased correspondingly. If the piston speed measured is too high, the current supplied to the valve 62 will be raised. Therefore, the magnetic force will increase, the slide 34 will move against the force of the spring by a certain amount, the throttling will increase, the volume flow and thus the cylinder speed will be reduced.

The cylinder speed can be kept at a constant value or a defined speed-time-curve can be maintained.

Unlike in FIG. 8, in FIG. 9 the pressure at the cylinder 68 is controlled. For this purpose, supply lines 631 and 632 lead to the chambers 681 and 682 of the cylinder 68. A controllable solenoid valve 621 is installed in the supply line 631 and a solenoid valve 622 without control is installed in the supply line 632. In our example, both valves are 3/2 solenoid valves. Return lines 641 and 642 lead from the valves 621 and 622 to the tank 67. Electrical lines 74 or 751 and 752 lead from a control unit 73 to the solenoid valve 621 or via transducers 761 and 762 to the chambers 681 and 682 of the cylinder 68. The designations already mentioned for FIG. 8 apply to the rest of the elements.

It is assumed that the pump 71 is running, the valve 622 is switched and the valve 621 is energized. Referring to the FIGS. 2–5, $I_0<I<I_4$ applies for the current; that means that the slide 34 is within the control range. The medium flows from the pump 71 via the valve 622 into the chamber 682 of the cylinder 68. This flow presses the piston 69 to the right in the drawing and the medium being in the chamber 681 is pressed via the valve 621 into the tank 67. Due to the position of the slide 34 in the solenoid valve 621 and the thus caused throttling of the medium flow by the valve 621, a certain pressure is reached in the line 651 from the cylinder 68 to the valve 621. The pump 71 determines the pressure in the line 652 between the valve 622 and the cylinder 68. The pressure difference between the lines 651 and 652 is directly proportional to the cylinder force.

The control unit 73 compares the pressure difference between the lines 651 and 652 with a default value depending on the specific application. If the pressure measured deviates from the default value, the control unit 73 calculates a new value for the current at the valve 621 with the help of the data saved and it transfers this value to this valve. If the pressure measured is too low, the current at the valve 621 will be increased. Consequently, the slide 34 increases the throttling of the medium flow by an appropriate amount that in its turn causes a sufficient increase of the pressure and therefore an increase of the cylinder force. If the pressure measured is too high, the current at the valve 621 will be reduced. As a result, the slide 34 decreases the throttling of the medium flow by an appropriate amount that in its turn causes an adjusted reduction of the pressure down to a pressure balance and thus also a reduction of the cylinder force.

The cylinder force can also be kept at a constant value or a defined force-time-curve can be maintained. It is also possible to limit the force.

In the previous explanations, the magnetic force has a minimum value, zero included, if the passages are opened, and a maximum value if the passages are closed. Vice versa, it is part of the invention that the magnetic force can also have a maximum value for opened passages and a minimum value, zero included, for closed passages. In the last given case, a special valve design is possibly required.

All elements presented in the description, the subsequent claims and the drawing can be decisive for the invention both as single elements and in any combination.

LIST OF REFERENCE NUMERALS 10 solenoid valve
11 electromagnet
12 control unit
13 housing
14,15 connection openings
16 connection
17 end
18 pins
19 winding body
20 wire-wound coil
21 extrusion
22 end
23 plug-type connector
24 line
25 bush
26 guiding pipe
27 armature
28 longitudinal borehole
29 bow
30, 51, 52, 53 sealing rings
31 pin
32 axial borehole
33 interior
34 slide
35 tank reflux
36 cylinder (consumer)
37 shoulder
38, 47 sealing balls
39, 46, 50 sealing seats
40, 68 cylinders
41, 41' boreholes
42 helical spring
43 adjusting element
44 guiding body
45 tappet
48 telescopic ball bearing traveler
49 cylinder
54, 56, 70 arrows
55, 66 filters
57, 58, 59, 60, 61 positions of the slide
62 solenoid valve
63, 64, 65 hydraulic lines
67 liquid tank
68 cylinder
69 piston
71 pump
72 pressure control valve
73 control unit
74, 75, 751, 752 electric lines
76, 761, 762 transducer
77 spring
631, 632, 651, 652 supply lines
641, 642 return lines
681, 682 chambers
621, 622 solenoid valves
M motor

The invention claimed is:

1. A controllable solenoid valve, comprising:
a valve housing;
a first sealing seat in the valve housing;
a slide which is displaceable in the valve housing in an axial direction of the housing between first and second final positions;
a first sealing body which is seatable in the first sealing seat and is engageable by the slide to be displaceable in the axial direction with the slide;
a cylindrical housing which surrounds the first sealing body and the first sealing seat;
radial throughpassages in the cylindrical housing;
a spring acting upon the slide counter to the magnetic force to maintain the slide in one of the final positions when the electromagnet is not sufficiently energized to drive the slide with force sufficient to completely overcome force of the spring; and
a solenoid comprising an electromagnet, the solenoid being operatively connected to the slide so that sufficient electrical energization of the solenoid to produce a magnetic force sufficient to completely overcome force of the spring displaces the slide from one of the final positions to the other of the final positions;

wherein the radial throughpassages are open when the slide is in the first final position and are closed when the slide is in the second final position or in an immediate vicinity thereof.

2. Solenoid valve according to claim 1, wherein the final position of the slide when the electromagnet is not sufficiently energized to drive the slide with force sufficient to completely overcome force of the spring is the first final position.

3. Solenoid valve according to claim 1, wherein the final position of the slide when the electromagnet is not sufficiently energized to drive the slide with force sufficient to completely overcome force of the spring is the second final position.

4. Solenoid valve according to claim 1, further comprising an abutment on the slide and wherein the spring is a helical spring which surrounds the slide with ends of the spring abutting against an end of the cylindrical housing and the abutment on the slide, respectively.

5. Solenoid valve according to claim 4, wherein position of the abutment relative to the slide is adjustable in the axial direction.

6. Solenoid valve according to claim 1, further comprising:

a second sealing seat;

a second sealing body which is seatable in the second sealing seat, wherein the sealing seats and the sealing bodies are so arranged relative to each other that respective directions in which the respective sealing bodies move relative to the respective sealing seats to effect respective seatings of the respective sealing bodies in the respective sealing seats are mutually opposed; and a tappet so interposed between the respective sealing bodies that the tappet lifts the second sealing body from the second sealing seat when the first sealing body is seated in the first sealing seat.

* * * * *